United States Patent [19]

McDonald

[11] 4,071,227

[45] Jan. 31, 1978

[54] SMALL MOVABLE HOT DESEAMER

[75] Inventor: Bridget M. A. McDonald, Nassau, Bahamas

[73] Assignee: I. P. U. Limited, Nassau, Bahamas

[21] Appl. No.: 631,477

[22] Filed: Nov. 13, 1975

[30] Foreign Application Priority Data

Nov. 14, 1974 Germany .............................. 2453989

[51] Int. Cl.² .............................................. B23K 7/06
[52] U.S. Cl. ........................................ 266/51; 266/67
[58] Field of Search ...................... 148/9.5; 266/51, 53, 266/67

[56] References Cited

U.S. PATENT DOCUMENTS

| | | | |
|---|---|---|---|
| 1,811,835 | 6/1931 | Anderson | 266/67 |
| 2,058,672 | 10/1936 | Eberle | 266/67 |
| 2,183,605 | 12/1934 | Bucknam et al. | 266/67 X |
| 2,221,825 | 11/1940 | Van Triest | 266/51 X |
| 2,287,103 | 6/1942 | Jones | 266/67 X |
| 2,515,302 | 7/1950 | Hughey | 266/51 |
| 2,541,344 | 2/1951 | Davis | 266/67 X |
| 3,596,892 | 8/1971 | Nakanishi et al. | 266/67 |

FOREIGN PATENT DOCUMENTS 1,804,882  6/1969  Germany .............................. 266/51

Primary Examiner—Roy Lake
Assistant Examiner—Paul A. Bell
Attorney, Agent, or Firm—Gifford, Chandler, Sheridan & Sprinkle

[57] ABSTRACT

A portable, remote controlled hot deseamer apparatus equipped with a nozzle arrangement and an ignition device which is suitable for selective hot deseaming or flame cutting of a workpiece.

5 Claims, 11 Drawing Figures

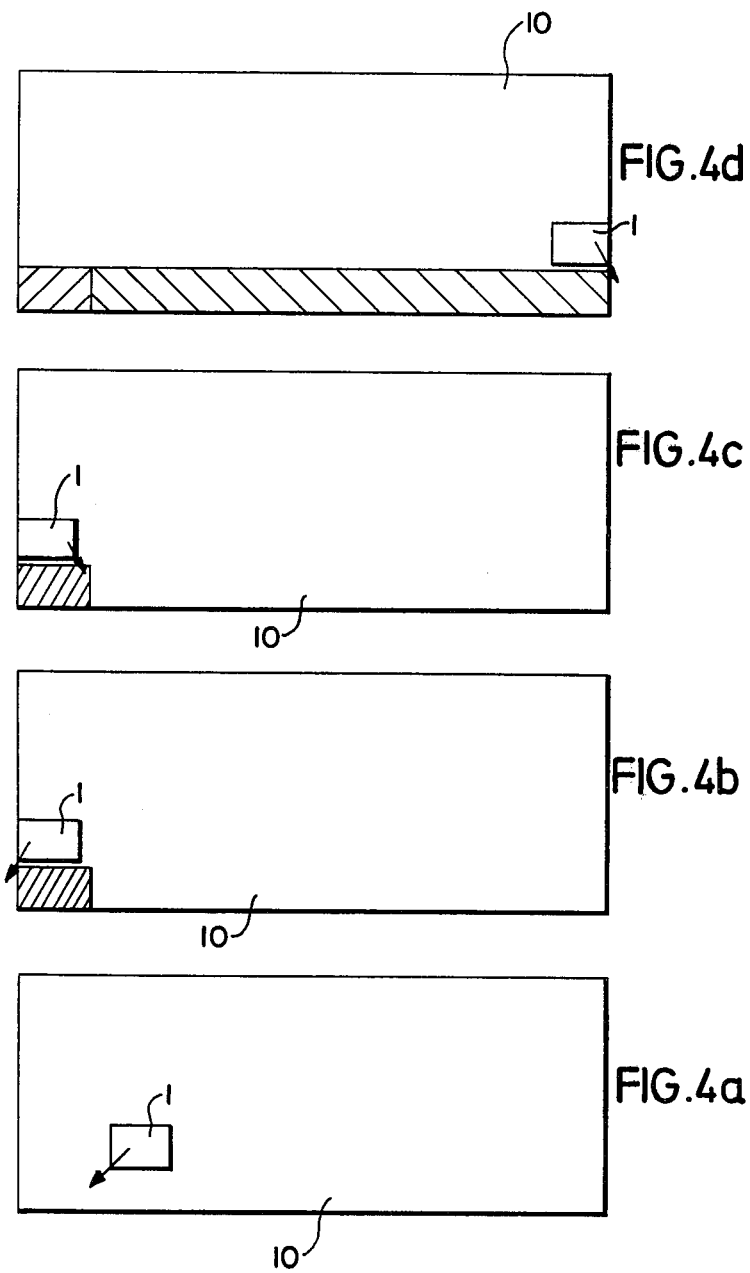

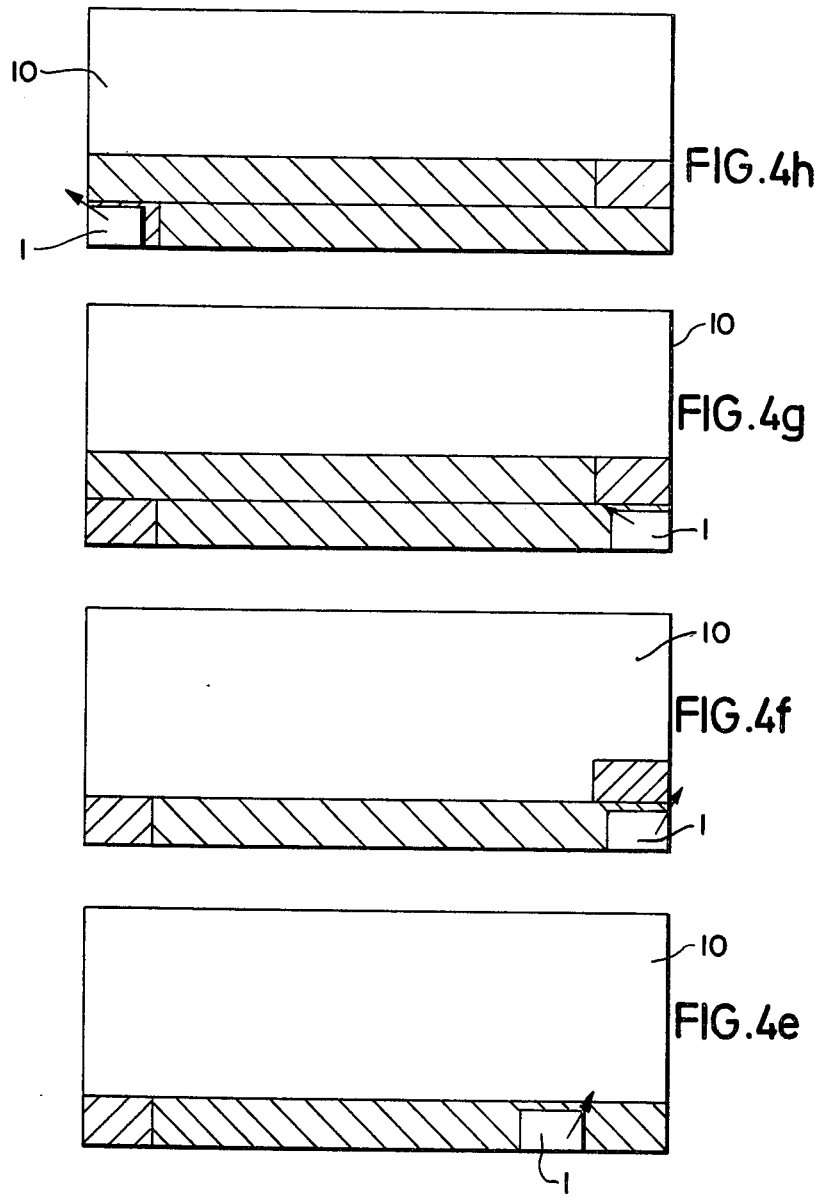

SMALL MOVABLE HOT DESEAMER

BACKGROUND OF THE INVENTION

I. Field of the Invention

The present invention relates to a small movable hot deseamer equipped with a nozzle arrangement and an ignition device which is suitable for selective hot deseaming or flame scarfing of defective portions or whole surfaces of steel, and the invention also concerns a method for the use of this machine.

II. Prior Art

In steel mills and rolling mills, hot deseaming devices and/or hot deseamers are used for the flame cutting of workpieces from steel which are mostly semifinished products, such as billets and slab blooms. Hand-operated devices for hot deseaming, which are also called hand deseamers, resemble large cutting torches and possess an igniter wire arrangement by which a short piece of iron wire having a diameter of about 5 mm is inserted into the constant flame of the heating nozzle before the flame producing oxygen is switched on and by which the flame iron wire is maintained at a discharge flow red hot condition. The glowing iron causes the discharge flow, rich in flame producing oxygen, to ignite on the surface of the workpiece. One can use a hand deseamer for carrying out all hot deseaming tasks starting with elimination of individual defective portions of the deseaming of the whole surface and the operator can move his device to various places to be deseamed, i.e., to the respective portion of the workpieces, depending upon the length of his feeding hose lines.

In general, the small quantity of fumes which are produced does not make it necessary to provide for exhaustion of the fumes, and a consumed igniter wire having a length of about 1 meter can be easily replaced with a new one. However, the weight of the device and the feeding hose lines limits the size of the deseaming nozzle, thus limiting the deseaming effect to a strip having the width of about 60 to 90 mm.

Also, hand deseaming becomes heavy physical work which in addition, requires heavy asbestos protective clothing for reasons of safety because the ambient temperature can increase to an undesirable degree by the hot or incandescent workpieces. The presently used process of hand deseaming which can generate heat, glowing scoria, and sparks is especially dangerous because gas and oxygen hose lines are in the immediate proximity of the operator.

Hot deseamers for flame cutting whole surfaces by one pass are very expensive and more or less stationary. They necessitate expensive auxiliary equipment including fume exhausting equipment. Therefore, their use for the deseaming of defective portions is not very practical. The known machines used for the hot deseaming of defective portions or for selective hot deseaming still have the drawbacks of the above hot deseamers which despite high capital investments still need an installation for exhausting fumes because of powder-train ignition. The workpieces have to be transported to the deseamers and the defective portions have to be marked since, under certain circumstances, the operator may stay too far away.

SUMMARY OF THE PRESENT INVENTION

The present invention has as its object to provide a small hot deseamer which is portable and movable preferably on the workpiece itself and which is equipped with a nozzle arrangement and an ignition device and to provide also a method for the use of this machine which is suitable for a wide range of applications, which operates reliably, and which guarantees maximum safety for the operator.

According to the invention, this task is solved, by providing a small hot deseamer that can be conveyed with its deseaming rate remotely controlled by electromotive force and characterized in that the nozzle arrangement is rotatable by remote control so that the nozzle arrangement can deseam forwards or backwards, and laterally to the left or to the right of the machine, depending upon the direction chosen for the running of the machine.

According to one design of the equipment, the machine can be conveyed in the direction of its lateral motion for the lateral displacement, for example, by one width of the strip to be deseamed. This is accomplished by the provision of rotatable arms which lift the machine and "walk" it to the right or left.

According to another design of the equipment, the nozzle arrangement comprises one or more hot-deseaming nozzles, nozzle mountings, valves for the adjustment of heating gas and heating oxygen, as well as a remotely controlled valve for the flame-gauging oxygen.

The ignition device for fast initiation of the hot deseaming on the surface of the workpiece comprises an ignition aid, for example, in the form of a remotely controlled igniter wire device or a powder-train ignition. According to another design of the equipment, a vertical axle or shaft for rotating the hot deseaming nozzle to the desired side or into the desired direction is tubularly shaped, opening upwardly, and if necessary, is provided with a filter so that the tube serves as a suction connection for air cooling the drive and other constructional units situated in the interior of the machine.

Bowden cables or hydraulic hoses are provided for remotely controlling the rotation or the driving of the wheels, the rotation of the arms, the rotation of the hot deseaming nozzle on the machine, the actuation of the valve for the flame-gauging oxygen, and the actuation of the igniter wire device so that the operator can protect himself by remaining a reasonable distance from the small hot deseamer in a position sideways or in the rear, which distance and position does not impair the quality of the opeation. The bowden cables, electric, pneumatic, or hydraulic control lines can be surrounded by a flexible protective hose which is pivoted on the machine or a master control handle and can even be used as an actuating line.

According to a further design of the equipment, the mounting support of the hot deseaming nozzle is articulated and by remote control can be tilted by 90° in order to deseam vertical surfaces, for example, the narrow sides of a slab bloom or the vertical longitudinal surfaces of rectangular billets.

When any place whatsoever on the workpiece is to be reached, then, according to the invention, the machine is disposed adjacent to the place to be deseamed, the nozzle is aligned with this place, and this place is reached by the choice of the direction of motion; next, the small hot deseamer is mounted on the workpiece parallel the workpiece edge by being mounted or displaced by one width of the strip to be deseamed and is then conveyed to a position which is distant from the front face by about one machine length. Then the deseaming nozzle is rotated in the direction of the adjacent face of the workpiece so that the nozzle points to the strip intended for deseaming which lies between the machine and the workpiece edge; then, the hot deseaming process is started by means of an ignition device, the hot deseamer is conveyed towards the front face until it reaches the edge of the front face, and after the power feed and the flame-gauging oxygen have been switched off, the nozzle is rotated in a direction away from the adjacent front face towards the remote end whereby it points to the starting point of the preceding hot deseaming operation whereupon a deseaming operation on another strip of the workpiece is started until the other front face is reached.

The small hot deseamer according to the invention has the advantage that the electromotive drive of its deseaming arrangement and the remote control of this drive relieve the operator from heavy work. The remote control guarantees him maximum protection from the development of heat and fumes. All together, this increases the deseaming output and its quality because the adjusted deseaming arrangement is uniformly guided at the working piece.

DESCRIPTION OF THE DRAWINGS

An example of the operation of the invention is described in the following with the aid of the attached drawings in which:

FIG. 3 shows part of a front face of the machine according to FIG. 1 with a device for lateral displacement; and FIGS. 4a–h show the method of operation of the small hot deseamer.

DESCRIPTION OF A PREFERRED EMBODIMENT

Figure 1:
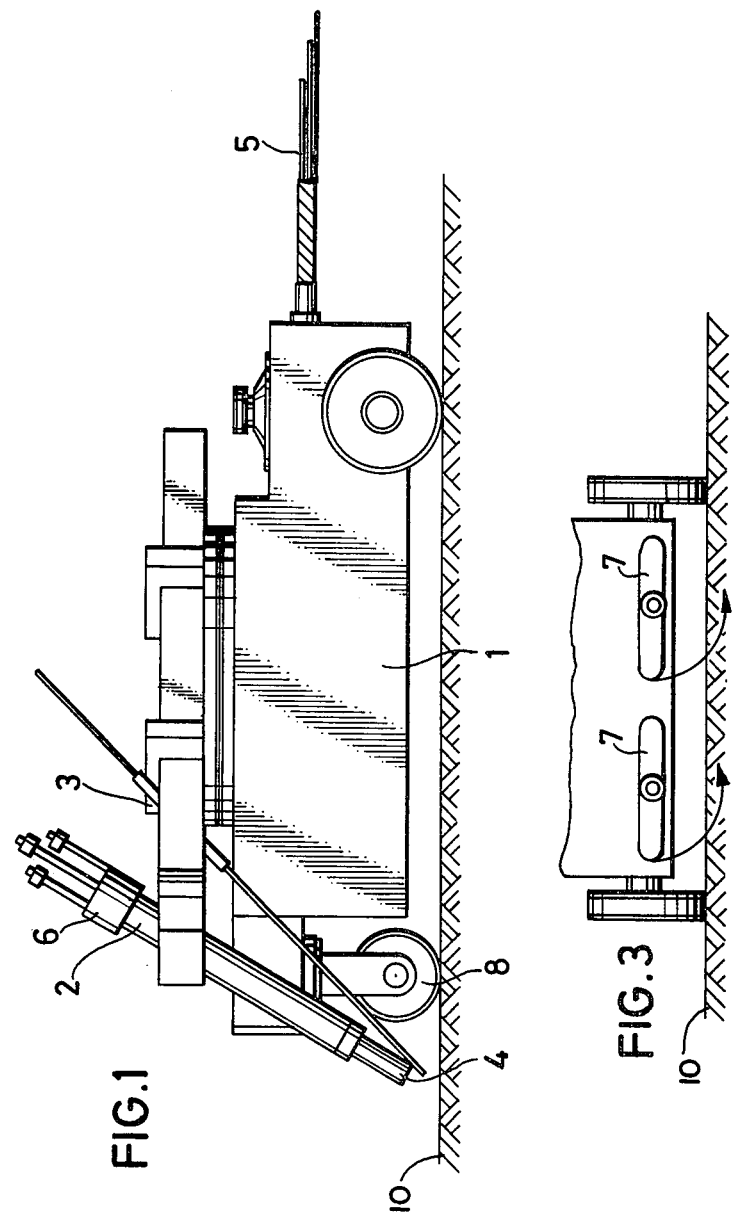
FIG. 1 shows the side view of a small hot deseamer.

As FIG. 1 shows, the small hot deseamer consists of a small carriage 1 having wheels 8 which can be driven in both directions of running by an electromotor supported in the carriage. The wheels 8 are adapted to move the carriage 1 on and along a workpiece 10. A reduction gear and a variable speed gear (not shown) are likewise disposed in the interior of the carriage 1 in order that velocities of motion can be continuously selected within the range of the hot deseaming velocities.

On the carriage 1, there are disposed one or several hot deseaming devices 2 which may be hand deseamers and which are equipped with an ignition device 3 that may be a portable igniting device as depicted. The hot deseaming devices 2 need not have the same design or the same output. Likewise, the deseaming nozzles 4 of the deseaming devices 2 do not have to be equal or the same size.

Figure 2:
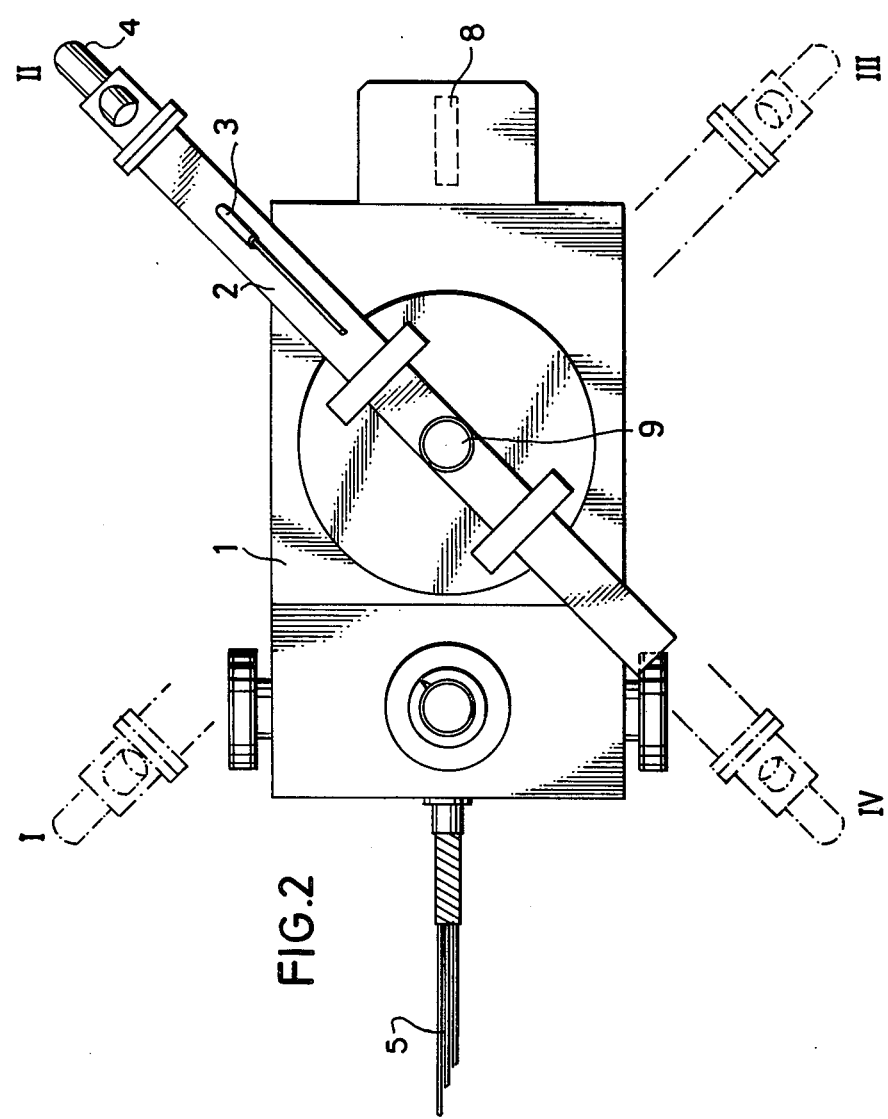
FIG. 2 shows the top view of the small hot deseamer according to FIG. 1.

The hot deseaming devices 2 on the carriage 1 can be rotated around an axle 9 (FIG. 2) and are rotated by means of bowden cables 5 so that as FIG. 2 shows, the hot-deseaming nozzle 4 can be brought into four different positions, i.e., position I in which the nozzle is located to the left in the rear, position II in which it is located to the left in the front, position III in which it is located to the right in the front, and position IV in which it is located to the right in the rear, provided that the bowden cables 5 are assumed to have been introduced into the rear end of the carriage 1. This arrangement of the hot deseaming device or devices 2 on the carriage 1 makes it possible to deseam portions of the workpiece 10 forwards and backwards on each side of the carriage. The ignition device 3 and also the spring-loaded valve (not shown) for the flame-gauging oxygen can be actuated in a conventional manner by means of an additional bowden cable.

A bowden cable or a flexible shaft (not shown) can also serve to actuate the system for the lateral displacement of the carriage of the machine which as FIG. 3 shows, can include two tiltable arms 7. Rotation of the arms 7 in the direction of the arrows shown in FIG. 3 will lift the carriage 1 and cause it to walk to the left in FIG. 3. Rotation in a direction opposite to the arrows will cause the carriage to "walk" to the right in FIG. 3. The electromotive drive which can also be controlled by a bowden cable can act upon one or two wheels.

The vertical swivel axles 9 (FIG. 2) on the carriage 1 serving for the rotation of the hot-deseaming devices 2 can be formed as a hollow tube and thus can be used as suction connection for air serving to cool the interior equipment of the carriage 1. This hollow axle can also serve for exhausting fumes or gases and can be connected with a manifold by means of a flexible hose (not shown).

By a bowden cable or by other means, the controlling lines are preferably conducted from a control handle (not shown) to the drive whence, together with the utility piping, they are conducted to a stationary point of the carriage which is connected with a switch cover. The same holds true for the electric cables for the switching-on and switching-off of the electric motor and for the reversal of the direction of running. The control elements, such as levers and buttons (not shown), can be placed into the control handle and contribute to the very simple manipulation of the machine.

FIGS. 4a to 4h show the use of the small hot deseamer on a workpiece 10. According to FIG. 4a, the machine is placed on top of the workpiece 10 but spaced away from the front edge of the workpiece 10 by a distance equivalent to one width of the strip to be deseamed. Then, the heating flame is ignited and adjusted.

In this case, the nozzle 4 of the hot-deseaming device 2 is rotated to the right rear of the carriage (position IV) and the deseaming of the extreme right strip of the workpiece 10 is carried out as the carriage 1 is returned to the starting front end as shown in FIG. 4b. Then, the nozzle 4 is rotated into position III (FIG. 4c), and the remainder of the outer right strip of the workpiece is deseamed as the carriage is driven toward the other end. After the carriage has been displaced towards its left by an additional width of the strip to be deseamed and brought back by one carriage length, a two-part deseaming operation can be finished.

Correspondingly, FIGS. 4e to 4h show another deseaming operation in which the deseaming carriage of the machine runs on the material 10.

I claim:

1. A small movable hot deseamer for selective deseaming of defective portions of a workpiece, said hot deseamer comprising a carriage, drive means and wheels rotatably mounted on said carriage for movement of said carriage along said workpiece in a first direction, a nozzle means mounted to said carriage, arms mounted to said carriage and selectively pivotal to a position in which said arms engage said workpiece and lift said carriage therefrom, said arms being mounted to said carriage to pivot about an axis parallel with said first direction whereby upon pivoting of said arms into engagement with said workpiece said deseamer is picked up from said workpiece and moved laterally in a second direction, said second direction being perpendicular to said first direction.

2. The deseamer as defined in claim 1 and including means pivotally mounting said nozzle means to said carriage about an axis perpendicular to said workpiece.

3. The deseamer as defined in claim 2 and in which said nozzle means comprises a holder pivotally mounted to said carriage to extend beyond said carriage and substantially parallel with respect to said workpiece and at least one nozzle mounted to said holder to extend toward said workpiece whereby said holder can be rotated to position said nozzle at a plurality of positions around said carriage.

4. The deseamer as defined in claim 2 and in which said last mentioned means comprises a vertically extending axle mounted to said carriage, said axle being tubular and opening to said drive means to provide means for cooling said drive means.

5. The deseamer as defined in claim 1 and including means for remotely controlling said disc means and said nozzle means.

* * * * *